(12) United States Patent
Albrecht et al.

(10) Patent No.: US 10,927,224 B2
(45) Date of Patent: Feb. 23, 2021

(54) PROCESS FOR MODIFYING POLYMER PARTICLES OF AN AQUEOUS POLYMER DISPERSION, AN AQUEOUS POLYMER DISPERSION OBTAINABLE BY SAID PROCESS, A REDISPERSIBLE POLYMER POWDER, AND A COMPOSITION COMPRISING THE REDISPERSIBLE POLYMER POWDER

(71) Applicant: BASF SE, Ludwigshafen am Rhein (DE)

(72) Inventors: Gerhard Albrecht, Prien am Chiemsee (DE); Sophie Putzien, Trostberg (DE); Torben Gaedt, Trostberg (DE); Michael Dietzsch, Trostberg (DE); Harald Grassl, Trostberg (DE); Iris Loescher, Trostberg (DE); Luc Nicoleau, Villevaude (FR)

(73) Assignee: BASF SE

( * ) Notice: Subject to any disclaimer, the term of this patent is extended or adjusted under 35 U.S.C. 154(b) by 94 days.

(21) Appl. No.: 16/093,437

(22) PCT Filed: Apr. 10, 2017

(86) PCT No.: PCT/EP2017/058537
§ 371 (c)(1),
(2) Date: Oct. 12, 2018

(87) PCT Pub. No.: WO2017/178422
PCT Pub. Date: Oct. 19, 2017

(65) Prior Publication Data
US 2019/0071545 A1 Mar. 7, 2019

(30) Foreign Application Priority Data
Apr. 14, 2016 (EP) .................. 16165334

(51) Int. Cl.
| | | |
|---|---|---|
| *C08K 3/08* | (2006.01) | |
| *C08J 3/12* | (2006.01) | |
| *C04B 40/00* | (2006.01) | |
| *C04B 2/00* | (2006.01) | |
| *C04B 24/26* | (2006.01) | |
| *C04B 24/28* | (2006.01) | |
| *C08J 3/05* | (2006.01) | |
| *C08K 3/22* | (2006.01) | |
| *C08K 3/34* | (2006.01) | |
| *C04B 103/00* | (2006.01) | |

(52) U.S. Cl.
CPC .............. *C08J 3/128* (2013.01); *C04B 2/00* (2013.01); *C04B 24/2641* (2013.01); *C04B 24/2676* (2013.01); *C04B 24/282* (2013.01); *C04B 40/0042* (2013.01); *C08J 3/05* (2013.01); *C08K 3/08* (2013.01); *C08K 3/22* (2013.01); *C08K 3/34* (2013.01); *C04B 2103/00* (2013.01); *C04B 2103/0057* (2013.01); *C08J 2325/10* (2013.01); *C08J 2325/12* (2013.01); *C08J 2333/08* (2013.01); *C08J 2353/02* (2013.01); *C08J 2375/06* (2013.01); *C08K 2003/2227* (2013.01)

(58) Field of Classification Search
CPC .... C08J 3/128; C08J 3/05; C04B 2/00; C04B 24/2641; C04B 24/282; C04B 40/0042; C08K 3/08; C08K 3/22; C08K 3/34
USPC ......................................................... 523/204
See application file for complete search history.

(56) References Cited

U.S. PATENT DOCUMENTS

| | | | |
|---|---|---|---|
| 3,409,578 A | 11/1968 | Hwa | |
| 5,874,524 A * | 2/1999 | Pakusch ..................... | C08J 3/16 528/482 |
| 6,136,891 A | 10/2000 | Chopin et al. | |
| 6,685,966 B1 | 2/2004 | Dominique et al. | |
| 6,765,072 B1 | 7/2004 | Willimann et al. | |
| 6,825,268 B2 | 11/2004 | Maier et al. | |
| 6,897,256 B1 * | 5/2005 | Dreher ................. | C09D 125/06 524/457 |
| 2009/0298998 A1 * | 12/2009 | Takamura ............... | C08L 25/08 524/556 |
| 2011/0160350 A1 * | 6/2011 | Bergman ................ | C04B 28/04 524/5 |

FOREIGN PATENT DOCUMENTS

| | | |
|---|---|---|
| DE | 40 03 422 A1 | 8/1991 |
| EP | 2 808 356 A1 | 12/2014 |
| WO | WO 01/29106 A1 | 4/2001 |
| WO | WO 2014/011730 A1 | 1/2014 |
| WO | WO 2014/013077 A1 | 1/2014 |
| WO | WO 2016/012315 A1 | 1/2016 |

OTHER PUBLICATIONS

Extended European Search Report dated Oct. 24, 2016 in Patent Application No. 16165334.0, 3 pages.
Joong Hwan Bahng, et al., "Anomalous Dispersions of 'Hedgehog' Particles" Nature, vol. 517, Jan. 29, 2015, pp. 596-599.
U.S. Appl. No. 16/092,140, filed Oct. 8, 2018, Michael Dietzsch, et al.
International Search Report dated May 29, 2017, in PCT/EP2017/058537 filed Apr. 10, 2017.

* cited by examiner

*Primary Examiner* — Hannah J Pak
(74) *Attorney, Agent, or Firm* — Faegre Drinker Biddle & Reath LLP

(57) ABSTRACT

The invention relates to a process for modifying polymer particles of an aqueous polymer dispersion in which positively or negatively charged polymer particles are provided with an inorganic salt shell. The inorganic shell leads to an improved drying ability and storage stability of the latex and improves the storage stability of the resulting polymer powder. The obtained polymer powder exhibits an improved viscosity and faster skin-forming time in the final application and is therefore particularly useful in a building material composition.

13 Claims, 1 Drawing Sheet

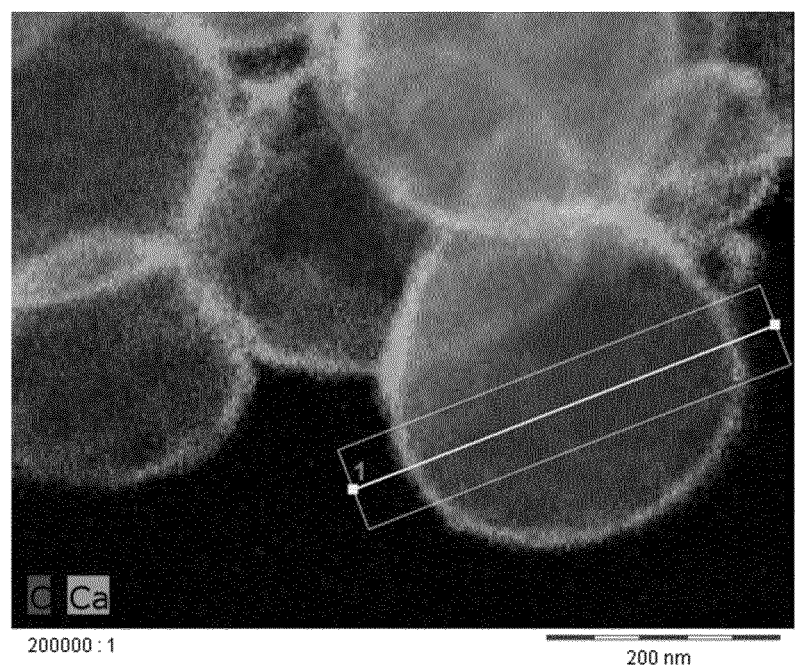

PROCESS FOR MODIFYING POLYMER PARTICLES OF AN AQUEOUS POLYMER DISPERSION, AN AQUEOUS POLYMER DISPERSION OBTAINABLE BY SAID PROCESS, A REDISPERSIBLE POLYMER POWDER, AND A COMPOSITION COMPRISING THE REDISPERSIBLE POLYMER POWDER

The present invention relates to a process for modifying polymer particles of an aqueous polymer dispersion, an aqueous polymer dispersion obtainable by said process, a redispersible polymer powder, and a composition comprising the redispersible polymer powder.

Redispersible powders are widely used in cement-based waterproofing systems, floor screeds, tile adhesives, etc. and provide flexibility and hydrophobization in these systems. Known redispersible powders (for example, Elotex®, Vinnapas®, Acronal®) are obtained by spray drying of latex dispersions in the presence of additives such as protective colloids, spray-drying aids or anti-caking additives. These additives prevent the irreversible aggregation of the polymer particles and enable sufficient redispersion in the final application system. However, they also reduce the wet-strength of the final product and may cause unwanted coloration or efflorescence. Furthermore they often lead to undesired fluidification and retardation of the final cementitious product. Thus, a redispersible polymer powder without these disadvantages would be highly desirable.

WO 2014/011730 A1 (Dow) describes redispersible multilayer polymer powder comprising an epoxy resin core and an alkali soluble polymer shell around the epoxy resin. The polymer particles are prepared by copolymerizing a monomer mixture in the presence of an epoxy resin dispersion, adding a strong acid salt or organic acid salt of a divalent metal prior to drying the dispersion.

WO 2001/029106 A1 (BASF SE) relates to a method for producing an aqueous dispersion of particles (composite particles) that are prepared by polymerizing a monomer mixture in the presence of fine particles of an inorganic solid matter such as a silica sol.

A. Ethirajan, U. Ziener, K. Landfester, *Chem. Mater.* 2009, 21, 2218-2225, describe polymeric nanoparticles synthesized via the miniemulsion process are employed as templates for biomimetic mineralization of hydroxyapatite in the aqueous phase. K. Schoeller, A. Ethirajan, A. Zeller, K. Landfester, *Macromol. Chem. Phys.* 2011, 212, 1165-1175, describe the formation of hybrid particles via the bio-inspired mineralization of calcium phosphate (CaP) on the surface of different surface-functionalized polymeric nanoparticles. In both cases, the modified latex particles are intended to be used as fillers or as scaffold for nucleation and growth of new bone material.

Nature, Vol 517, 2015, 596-599 discloses anomalous dispersions of "hedgehog" particles which consist of micrometer-sized particles that are coated with stiff, nanoscale spikes and exhibit long-term colloidal stability in both hydrophilic and hydrophobic media. The particles are prepared by surface corrugation of negatively charged carboxylated polystyrene microspheres by attaching rigid zinc oxide nanoscale spikes. This involves initial absorption of positively charged zinc nanoparticles onto the polystyrene microspheres and subsequent growth of zinc oxide nanowires. It is believed that the particles could be used to develop adsorbers, absorbers, scatterers or catalysts that need to function in both organic and aqueous media.

U.S. Pat. No. 3,409,578 discloses the preparation of dry water-insoluble film-forming polymer (latex) particles which are water-redispersible. The latex or the dispersant used for dispersing the latex must contain carboxylate groups. A surface-hardening monovalent heavy metal ion such as silver, cuprous or mercurous ion, or a polyvalent metal ion such as calcium or aluminum ion are added to the latex to form a protective layer around the polymer particles. For redispersing the particles in an aqueous medium the surface-hardening metal ion has to be removed by forming an insoluble salt or by forming a complex ion therewith.

WO 2014/011730 discloses redispersible multilayer polymer powders comprising an epoxy resin core and an outer layer of an alkali soluble polymer. Upon redispersion of the particles an additive is added which is selected from a divalent metal ion having a pKa of ≥9.55 and its strong acid or organic acid salt having a pH in water of ≤7.0.

The problem underlying the invention is to provide a redispersible polymer powder without the disadvantages mentioned above. In particular, the polymer powder should exhibit improved drying ability and storage stability without unwanted discoloration. Furthermore, the polymer powder should provide a low retardation and fluidification. In addition, the polymer powder should provide improved wet-strength and workability (especially tackiness) and should not impair the mechanical properties of the final cementitious product.

This problem is solved by a process for modifying polymer particles of an aqueous polymer dispersion, which comprises the steps of
  a) providing an aqueous polymer dispersion containing positively or negatively charged polymer particles;
  b) adding at least one first water-soluble salt of a multivalent metal selected from magnesium, calcium, barium, aluminum, zirconium, iron or zinc, or a mixture of two or more salts thereof, wherein the first salt essentially does not contain anions as defined in step c);
  c) adding at least one second water-soluble salt comprising anions selected from aluminate, silicate, borate, sulfate, carbonate, or a mixture of two or more salts thereof,
  wherein the second salt essentially does not contain cations as defined in step b); and wherein the sequence of said steps is in the order a), b), c) in the case of negatively charged polymer particles, or a), c), b) in the case of positively charged polymer particles.

The first salt is "essentially" free of an anion as defined in step c) and the second salt is "essentially" free of cations as defined in step b). The term "essentially" as used herein means that the first salt does not comprise more than 5% by weight, preferably not more than 1% or 0.1% by weight and in particular 0% by weight, of an anion as defined in step c) and that the second salt does not comprise more than 5% by weight, preferably not more than 1% or 0.1% by weight and in particular 0% by weight, of a cation as defined in step b), based on the weight of the first or second salt, respectively.

BRIEF DESCRIPTION OF THE DRAWINGS

FIG. 1 shows a cross section of a polymer particle of the invention.

The average diameter of the particles is generally in the range of 10 to 2000 nm (measured by dynamic light scattering as described hereinbelow). More preferably, the polymer particles in step a) have a particle size of ≤2.0 μm, preferably ≤1.1 μm, more preferably ≤800 nm and in particular ≤400 nm, as determined by dynamic light scattering.

One component used in the process of the invention is an aqueous polymer dispersion whose dispersion polymer has a glass transition temperature in the range from about −50° C. to about 50° C.

The term "glass transition temperature" or "Tg" is in the context of this document the midpoint temperature according to ASTM D 3418-12 determined by differential thermal analysis (DSC; heating rate: 20 K/min) [see. also Ullmann's Encyclopedia of Industrial Chemistry, page 169, Verlag Chemie, Weinheim, 1992 and Zosel in paint and varnish, 82, pages 125 to 134, 1976].

According to Fox (T. G. Fox, Bull. At the. Phys. Soc. 1956 [Ser. II] 1, page 123 and according to Ullmann's Encyclopedia of Industrial Chemistry, Vol. 19, page 18, 4. Edition, Verlag Chemie, Weinheim, 1980) the glass transition temperature of at most weakly crosslinked copolymers can be estimated to a good approximation by the following equation $$1/Tg = x1/Tg1 + x2/Tg2 + \ldots xn/Tgn,$$

where $x1, x2, \ldots xn$ are the mass fractions of the monomers $1, 2, \ldots n$ and $Tg1, Tg2, \ldots Tgn$ are the glass transition temperatures in degrees Kelvin of the homopolymers of the monomers $1, 2, \ldots n$. The glass transition temperatures of these homopolymers of most ethylenically unsaturated monomers are known (or can be determined in a simple manner known per se) and are listed, for example, in J. Brandrup, E. H. Immergut, Polymer Handbook, 1st Ed. J. Wiley, New York, 1966, 2nd Ed. J. Wiley, New York, 1975, 3rd Ed. J. Wiley, New York, 1989, and in Ullmann's Encyclopedia of Industrial Chemistry, page 169, Verlag Chemie, Weinheim, 1992.

All naturally occurring and/or synthetic polymers contemplated having a glass transition temperature in the range from about −50° C. to about 50° C. may be suitable. Examples are dispersion polymers P on basis of natural products such as nitrocellulose, cellulose esters, rosin and/or shellac. Examples for synthetic dispersion polymers are polycondensation products, such as alkyd resins, polyesters, polyamides, silicone resins and/or epoxy resins and polyadducts, such as polyurethanes. Polyaddition products are preferably polymers which are composed of ethylenically unsaturated compounds in polymerized form. The preparation of these polyaddition compounds is generally carried out by methods familiar to the skilled person, i.e. by metal complex catalyzed, anionically catalyzed, cationically catalyzed, and particularly by free-radical polymerization of ethylenically unsaturated compounds.

The free-radical polymerization of ethylenically unsaturated compounds may be effected by the method of free-radical bulk, emulsion, solution, precipitation or suspension polymerization, but the free radical aqueous emulsion polymerization is preferred.

The procedure for free radical emulsion polymerization of ethylenically unsaturated compounds (monomers) in an aqueous medium has been described, for example in Encyclopedia of Polymer Science and Engineering, Vol. 8, pages 659 ff. (1987); D. C. Blackley, in High Polymer latexes, Vol. 1, pages 35 et seq. (1966); H. Warson, The Applications of Synthetic Resin Emulsions, Chapter 5, pages 246 et seq. (1972); D. Diederich, Chemie in unserer Zeit 24, pages 135-142 (1990); Emulsion Polymerization, Interscience Publishers, New York (1965); DE-A 40 03 422, and Dispersions of synthetic high polymers, F. Holscher, Springer-Verlag, Berlin (1969).

Suitable monomers are, in particular, easily free-radically polymerizable monomers, such as ethylene, vinyl aromatic monomers such as styrene, o-methylstyrene, o-chlorostyrene or vinyltoluene, vinyl halides, such as vinyl chloride or vinylidene chloride, esters of vinyl alcohol and monocarboxylic acids having 1 to 18 C-atoms, as vinyl acetate, vinyl propionate, vinyl n-butyrate, vinyl laurate and vinyl stearate, esters of α,β-monoethylenically unsaturated mono- and dicarboxylic acids having preferably 3 to 6 C-atoms, especially acrylic acid, methacrylic acid, maleic acid, fumaric acid and itaconic acid, with alkanols having, in general, from 1 to 12, preferably 1 to 8 and especially 1 to 4, carbon atoms, such as methyl, ethyl, n-butyl, -iso-butyl, pentyl, hexyl, -heptyl-, octyl, -nonyl-, decyl and 2-ethylhexyl acrylate and methacrylate, dimethyl maleate, di-n-butyl fumarate, dimethyl maleate, di-n-butyl maleate, nitriles of α,β-monoethylenically unsaturated carboxylic acids, such as acrylonitrile, methacrylonitrile, fuma-rodinitrile, maleodinitrile and conjugated $C_4$-$C_8$ dienes such as 1,3-butadiene and isoprene.

Said monomers generally form the principal monomers, which are used in a proportion, based on the amount of all ethylenically unsaturated compounds used for preparation (total amount), of ≥50 wt.-%, preferably ≥80 wt.-% and most preferably ≥90 wt.-%. In general, these monomers have only moderate to low solubility (at 20° C., 1.013 bar).

Monomers which have increased water solubility under the abovementioned conditions, are those which contain at least one acid group and/or the corresponding anion thereof or at least one amino, amido, ureido or N-heterocyclic group and/or protonated on the nitrogen either or alkylated ammonium derivatives. Examples include α,β-monoethylenically unsaturated mono- and dicarboxylic acids and their amides such as acrylic acid, methacrylic acid, maleic acid, fumaric acid, itaconic acid, acrylamide and methacrylamide, and also vinylsulfonic acid, 2-acrylamido-2-methylpropanesulfonic acid, styrenesulfonic acid and the water-soluble salts thereof as well as N-vinylpyrrolidone, 2-vinylpyridine, 4-vinylpyridine, 2-vinylimidazole, 2-(N,N-dimethylamino)ethyl acrylate, 2-(N,N-dimethylamino)ethyl-methacrylate, 2-(N,N-diethylamino)ethyl acrylate, 2-(N,N-diethylamino)ethylmethacrylate, 2-(N-tert-butylamino)ethylmethacrylate, N-(3-N',N'-dimethylaminopropyl)methacrylamide and 2-(1-imidazolin-2-onyl)ethylmethacrylate. In the normal case, the aforementioned monomers are present only as modifying monomers in amounts of ≤10 wt.-%, preferably ≤5 wt.-%, based on the total amount of monomers.

Monomers which usually increase the internal strength of the films of the polymer matrix normally contain at least one epoxy, hydroxyl, N-methylol or carbonyl group, or at least two nonconjugated ethylenically unsaturated double bonds. Examples include monomers having two vinyl radicals, monomers containing two vinylidene radicals, or monomers containing two alkenyl radicals. Particularly advantageous are the diesters of dihydric alcohols with α,β-monoethylenically unsaturated monocarboxylic acids, among which acrylic acid and methacrylic acid are preferred. Examples of monomers having two nonconjugated ethylenically unsaturated double bonds are alkylenglycoldiacrylates and dimethacrylates, such as ethylene glycol diacrylate, 1,2-propylene glycol diacrylate, 1,3-propylene glycol diacrylate, 1,3-butylene glycol diacrylate, 1,4-butylenglykoldiacrylate ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and divinylbenzene, vinyl methacrylate, vinyl acrylate, allyl methacrylate, allyl acrylate, diallyl maleate, diallyl fumarate, methylenebisacrylamide, Cyclopentadienylacrylat, triallyl cyanurate or triallyl isocyanurate. In this context, of particular importance are also the $C_1$-$C_8$ hydroxyalkyl esters of methacrylic and acrylic acid such as hydroxyalkyl as 2-hydroxyethyl, 3-hydroxypropyl or 4-hydroxybutyl acrylate and -methacrylate, and compounds such as diacetone acrylamide and acetylacetoxyethyl acrylate. Frequently, the abovementioned monomers are used in amounts of ≤5 wt.-%, preferably ≤3 wt.-%, each based on the total amount of monomers used.

In one embodiment the dispersion polymer includes in copolymerized form:

| | |
|---|---|
| ≥50 and ≤99.9 wt.-% | esters of acrylic and/or methacrylic acid with alkanols having 1 to 12 C and/or styrene, or |
| ≥40 and ≤99.9 wt.-% | styrene and/or butadiene, or |
| ≥50 and ≤99.9 wt.-% | vinyl chloride and/or vinylidene chloride, or |
| ≥40 and ≤99.9 wt.-% | vinyl acetate, vinyl propionate and/or ethylene. |

In another embodiment the dispersion polymer includes in copolymerized form:

| | |
|---|---|
| ≥0.1 and ≤5 wt.-% | at least one α,β-monoethylenically unsaturated mono- and/or dicarboxylic acid having 3 to 6 carbon atoms and/or the amide thereof and |
| ≥50 and ≤99.9 wt.-% | at least one ester of acrylic and/or methacrylic acid having 1 to 12 C-alkanols and/or styrene, or |
| ≥0.1 and ≤5 wt.-% | at least one α,β-monoethylenically unsaturated mono- and/or dicarboxylic acid having 3 to 6 carbon atoms and/or the amide thereof and |
| ≥40 and ≤99.9 wt.-% | styrene and/or butadiene, or |
| ≥0.1 and ≤5 wt.-% | at least one α,β-monoethylenically unsaturated mono- and/or dicarboxylic acid having 3 to 6 carbon atoms and/or the amide thereof and |
| ≥50 and ≤99.9 wt.-% | vinyl chloride and/or vinylidene chloride, or |
| ≥0.1 and ≤5 wt.-% | at least one α,β-monoethylenically unsaturated mono- and/or dicarboxylic acid having 3 to 6 carbon atoms and/or the amide thereof and |
| ≥40 and ≤99.9 wt.-% | vinyl acetate, vinyl propionate and/or ethylene in copolymerized form. |

In another embodiment the dispersion polymer includes in copolymerized form:

| | |
|---|---|
| ≥45 and ≤55 wt.-% | n-butyl acrylate and/or 2-ethylhexyl acrylate |
| ≥45 and ≤55 wt.-% | styrene and/or methyl methacrylate |
| ≥0.1 and ≤5 wt.-% | acrylic acid and/or methacrylic acid and |
| ≥0.1 and ≤5 wt.-% | acrylamide and/or methacrylamide | wherein, in all embodiments above, the total wt.-% adds up to 100, in copolymerized form.

The aqueous polymer dispersion used in step (a) is formed by emulsion polymerization of α,β-monoethylenically unsaturated monomers which is carried out in a conventional manner in the presence of a radical initiator, chain transfer agents etc., as, for example, disclosed in WO 2016/012315, page 6, lines 19 to page 10, line 6 which is incorporated herein by reference.

Typically, in the preparation of dispersion polymers P by radical-initiated aqueous emulsion polymerization dispersion aids are used that disperse both the monomer droplets and the polymer particles in the aqueous phase. Protective colloids and/or emulsifiers usually used for carrying out free radical aqueous emulsion polymerizations are suitable.

Suitable protective colloids are for example polyvinyl alcohols, cellulose derivatives or vinyl-pyrrolidone-containing copolymers. A detailed description of further suitable protective colloids is given in Houben-Weyl, Methods of Organic Chemistry, Volume XIV/1, Macromolecular Materials, pages 411-420, Georg Thieme Verlag, Stuttgart., 1961. Of course, mixtures of emulsifiers and/or protective colloids can be used. Customary emulsifiers are, for example, ethoxylated mono-, di- and tri-alkylphenols (EO units: 3 to 50, alkyl radical: C4 to C12), ethoxylated fatty alcohols (EO units: 3 to 50; alkyl radical: C8 to C36) and alkali metal and ammonium salts of alkyl sulfates (alkyl: C8 to C12), of sulfuric monoesters of ethoxylated alkanols (EO units: 4 to 30, alkyl radical: C12 to C18), and ethoxylated alkylphenols (EO units: 3 to 50, alkyl radical: C4 to C12), of alkylsulfonic acids (alkyl radical: C12 to C18) and of alkylarylsulfonic acids (alkyl radical: C9 to C18). Further suitable emulsifiers are given in Houben-Weyl, Methods of Organic Chemistry, Volume XIV/1, Macromolecular Materials, pages 192 to 208 Georg-Thieme-Verlag, Stuttgart., 1961.

Suitable surfactants are further compounds of the general formula I

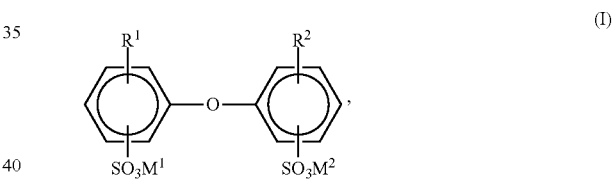

wherein $R^1$ and $R^2$ are H or $C_4$ to $C_{24}$ alkyl but not simultaneously H, and $M^1$ and $M^2$ are alkali metal ions or ammonium ions.

The dispersion comprises polymer particles having, in general, a size (diameter) in the range from about 100 nm to 800 nm, as determined by dynamic light scattering (Z-average) with a Malvern Zetasizer Nano-ZS (as described hereinbelow). The negative surface charge may be achieved by copolymerizing at least one anionic or anionogenic monomer. Thus, the polymer may be a copolymer formed of at least one nonionic monomer and at least one anionic or anionogenic monomer which is copolymerizable with the nonionic monomer. Suitable nonionic monomers are, for example, esters of $C_3$-$C_6$ α,β-monoethylenically unsaturated mono and α,β-monoethylenically unsaturated $C_4$-$C_8$ dicarboxylic acids, such as acrylic acid, methacrylic acid, maleic acid, fumaric acid and itaconic acid, with linear or branched $C_1$-$C_{12}$ alkanols, preferably $C_1$-$C_8$ alkanols. Examples for such esters are methyl acrylate, ethyl acrylate, n-butyl acrylate, isobutyl acrylate, t-butyl acrylate, octyl acrylate, 2-ethylhexyl acrylate, decyl acrylate, methyl methacrylate, ethyl methacrylate, n-butyl methacrylate, isobutyl methacrylate, t-butyl methacrylate, octyl methacrylate, 2-ethylhexyl methacrylate, decyl methacrylate, dimethylfumarate, di-n-butyl fumarate, dimethyl maleate, or di-n-butyl maleate.

Suitable nonionic monomers are also vinylaromatic monomers, such as styrene, α-methylstyrene, o-chlorostyrene, or vinyltoluenes; olefins, such as ethylene or propylene; vinyl halides, such as vinyl chloride or vinylidene chloride; or vinyl or allyl esters of $C_1$-$C_{18}$, preferably $C_1$-$C_{12}$, monocarboxylic acids, such as vinyl acetate, vinyl propionate, vinyl n-butyrate, vinyl laurate or vinyl stearate. One, two or more of the nonionic monomers may be used.

The anionic or anionogenic monomers have an anionic or anionogenic functionality in their molecules such as —COOH, —$SO_3H$, —$OPO_3H_2$, —$PO_3H$, —OH or —CN (the —CN group may be at least partially hydrolyzed in alkaline medium to a carboxyl group). The preferred functionality is a carboxyl group —COOH. Suitable monomers are, for example, $C_3$-$C_6$ α,β-monoethylenically unsaturated mono and dicarboxylic acids or anhydrides of said dicarboxylic acids, such as acrylic acid, methacrylic acid, crotonic acid, itaconic acid, fumaric acid, maleic acid, or maleic anhydride; vinylsulfonic acid, 2-acrylamido-2-methylpropane sulfonic acid, 2-sulfoethyl acrylate, 2-sulfoethyl methacrylate, sulfopropyl acrylate, sulfopropyl methacrylate, styrene sulfonic acid, and 2-propene-1-sulfonic acid, vinylphosphonic acid, vinylbenzylphosphonic acid. Said monomers may be used in form of the acid or in form of the salt thereof.

The positive surface charge may be achieved by copolymerizing at least one cationic or cationogenic monomer. Thus, the polymer may be a copolymer formed of at least one nonionic monomer and at least one cationic or cationogenic monomer which is copolymerizable with the nonionic monomer. Suitable nonionic monomers are as given above.

The cationic or cationogenic monomers have a cationic or cationogenic functionality in their molecules such as —$NH_2$, —$NH_3^+$, $NR_3$, —$NR_3^+$. The preferred functionality is a quaternary am-monium group. Suitable monomers are, for example, 2-aminoethylacrylate, 2-aminoethyl-methacrylate, 2-ammoniumethylacrylate chloride, 2-ammoniumethylmethacrylate chloride, 2-dimethylaminoethylacrylate, 2-dimethylaminoethylmethacrylate 2-trimethylammoniumethyl-acrylate chloride or 2-trimethylammoniumethylmethacrylate chloride.

In an embodiment, the polymer is α) a copolymer of a non-ionic monomer (i) which is selected from esters of $C_3$-$C_6$ α,β-monoethylenically unsaturated monocarboxylic acid and α,β-monoethylenically unsaturated $C_4$-$C_8$ dicarboxylic acids, a further non-ionic monomer (ii) which is selected from vinylaromatic monomers, such as styrene, α-methylstyrene, o-chlorostyrene, or vinyltoluenes, and vinyl or allyl esters of $C_1$-$C_{18}$, preferably $C_1$-$C_{12}$, monocarboxylic acids, such as vinyl acetate, vinyl propionate, vinyl n-butyrate, vinyl laurate or vinyl stearate and anionic or anionogenic monomers (iii) having an anionic or anionogenic functionality in their molecules.

The copolymer α) may include units of additional monomers (iv). Such monomers are selected from (meth)acrylamide, N,N-mono-und di-$C_1$-$C_4$-alkyl(meth)acrylamides, (meth)acrylnitrile, N-vinyl derivates of cyclic lactams, hydroxy-$C_2$-$C_4$-alkyl(meth)acrylates, N,N-mono-und di-$C_1$-$C_4$-alkylaminoalkyl(meth)acrylates. Preferred monomers (iv) are hydroxy-$C_2$-$C_4$-alkyl(meth)acrylates, such as hydroxyethyl acrylate or hydroxyethyl methacrylate; acrylamide, methacrylamide acrylonitrile, and methacrylonitrile.

The copolymer α) may also be crosslinked. This is achieved by using in addition at least one crosslinking agent (v) with two or more functional groups that is copolymerized or can react with functional groups of comonomers, in particular comonomers having two or more ethylenic unsaturations, such as butadiene, divinyl benzene, vinyl (meth)acrylate, allyl (meth)acrylate, diallyl maleate, methylenebisacrylamide, or alkylene glycol di(meth)acrylates such as ethylene glycol di(meth)acrylate, 1,2-propylene glycol di(meth)acrylate or 1,3-propylene glycol di(meth)acrylate, or glycidyl(meth)acrylate.

According to an embodiment, the copolymer α) is prepared by copolymerizing at least one nonionic monomer (i) selected from esters of $C_3$-$C_6$ α,β-monoethylenically unsaturated monocarboxylic acids and $C_4$-$C_8$ α,β-monoethylenically unsaturated dicarboxylic acids, in particular methyl acrylate, ethyl acrylate, n-butyl acrylate, methyl methacrylate, ethyl methacrylate, and n-butyl methacrylate, at least one vinylaromatic monomer (ii), in particular styrene or α-methylstyrene, at least one anionic or anionogenic monomer (iii) selected from $C_3$-$C_6$ α,β-monoethylenically unsaturated mono acids, in particular acrylic acid or methacrylic acid, optionally an additional monomer (iv), in particular (meth)acrylonitrile and/or (meth)acrylamide, and optionally a crosslinking monomer (v), in particular butadiene, glycidyl(meth)acrylate or divinylbenzene.

According to a further embodiment, the polymer is β) a copolymer of at least one nonionic monomer selected from vinylaromatic monomers, in particular styrene or α-methylstyrene, with (meth)acrylonitrile and a crosslinking monomer, in particular butadiene.

In a still further embodiment the polymer is γ) a copolymer of at least one olefin such as ethylene with at least one vinyl ester of a $C_1$-$C_{18}$ monocarboxylic acid, such as vinyl acetate.

In a still further embodiment the polymer is δ) a polyurethane comprising carboxylic acid and/or carboxylate groups and/or sulfo groups. Such polyurethanes may be obtained by reacting at least one polyisocyanate with at least one anionogenic polyol having two or more hydroxyl groups reactive towards polyisocyanates and one or more carboxyl and/or sulfo groups which are inert to polyisocyanates and some or all of which can be converted into carboxylate and/or sulfo groups in the presence of bases. Examples for such polyols are 2-hydroxymethyl-3-hydroxypropanoic acid, 2-hydroxymethyl-3-methyl-3-hydroxypropanoic acid, 2-hydroxymethyl-2-ethyl-3-hydroxypropanoic acid, 2-hydroxymethyl-2-propyl-3-hydroxypropanoic acid, citric acid, tartaric acid, [tris(hydroxymethyl]-3-aminopropanesulfonic acid, building blocks based on 1,3-propane sulfone or 3-mercaptopropanesulfonic acid sodium salt. The molecular weight of the polyol is, in general, in the range from 100 to 1000 Dalton. Preferred polyurethanes of this type are disclosed in U.S. Pat. No. 6,825,268, in particular in the claims, which is incorporated herein by reference in its entirety.

The term "(meth)" as used herein means that the chemical names in which it is used comprise the respective acrylic and methacrylic compound.

The surface charge of the polymer may also be achieved by coating the polymer particles with a surfactant having a hydrophobic tail and an ionic or ionizable head. The hydrophobic tail will be oriented towards the polymeric core, whereas the charges of the surfactant molecules will be oriented towards the aqueous medium conferring a surface charge to the polymer particle. Suitable surfactants are, for example, the formaldehyde condensates of naphthalene sulfonic acid, phenol sulfonic acid or melamine sulfonic acid, sulfonated ketone (acetone) formaldehyde condensate, alkali metal or ammonium salts of $C_8$-$C_{12}$ alkyl sulfates, alkali metal or ammonium salts of saturated or unsaturated $C_8$-$C_{18}$ fatty alcohol sulfates, alkali metal or ammonium salts of sulfuric acid half esters of saturated or unsaturated $C_8$-$C_{18}$ fatty alcohols which are ethoxylated with 2 to 50 ethylene oxide units or of $C_4$-$C_{12}$ alkylphenols which are ethoxylated with 3 to 50 ethylene oxide units, or of $C_9$-$C_{18}$ alkylaryl sulfonic acids, alkali metal or ammonium salts of mono- or di-$C_8$-$C_{18}$ alkyl sulfosuccinates, alkali metal or ammonium salts of mono- or di-$C_8$-$C_{18}$ alkenyl sulfosuccinates, alkali metal or ammonium salts of mono- or di-$C_8$-$C_{18}$ alkyl sulfosuccinates which are ethoxylated with 2 to 50 ethylene oxide units, alkali metal or ammonium salts of mono- or di-$C_8$-$C_{18}$ alkenyl sulfosuccinates which are ethoxylated with 2 to 50 ethylene oxide units, acidic phosphoric acid esters of $C_8$-$C_{18}$ alkanols which are ethoxylated with 2 to 50 ethylene oxide units and the alkali metal or ammonium salts thereof, alkali metal or ammonium salts of saturated or unsaturated $C_8$-$C_{18}$ fatty acids, saturated or unsaturated $C_8$-$C_{18}$ fatty alcohols which are ethoxylated with 2 to 50 ethylene oxide units and the phosphorylated, carboxylated or sulfated derivatives thereof, $C_9$-$C_{13}$ oxoalcohols which are ethoxylated with 2 to 50 ethylene oxide units, $C_8$-$C_{14}$ alkylpolyglucosides, ethylene oxide-propylene oxide block polymers with 10 to 80% ethylene oxide units, or polycarboxylate ethers (comb polymers having a backbone of units with anionic or anionogenic groups and $C_2$-$C_4$ polyalkylene oxide side chains, for example as disclosed for example in WO 2014/013077, pages 10-22, embodiments 25-49). The amount of surfactant is, in general, 0.1 wt.-% to 10 wt.-%, based on the weight of the polymer.

The surfactant may already be comprised by the polymer dispersion used or may be added prior to the addition of the first or, respectively, second water-soluble salt. Thus, when using a surfactant to achieve the surface charge, it is not required to use a comonomer having an ionic or ionogenic functionality in its molecule.

The ionic or ionogenic monomers or the surfactant are used in an amount sufficient to achieve a sufficient negative or positive "surface charge" in the range from about −30 µmol/g polymer to about −300 µmol/g polymer or from about +30 µmol/g polymer to about +300 µmol/g polymer, preferably in the range from about −50 µmol/g polymer to about −300 µmol/g polymer or from about +50 µmol/g polymer to about +300 µmol/g polymer and in particular in the range from about −50 µmol/g polymer to −200 µmol/g polymer or from about +50 µmol/g polymer to about +200 µmol/g polymer. The surface charge is determined by titration with poly-DADMAC (poly(diallyldimethylammonium chloride)) or sodium polyethylene sulfonate using a Mettler Toledo DL 28 Titrator combined with a BTG Mütek Particle charge detector.

In general, the polymer has a glass transition temperature Tg (midpoint temperature according to ASTM D3418-82) measured by DSC (Differential Scanning calorimetry) or calculated according to the Fox equation (Ullmann's Encyclopedia of Industrial Chemistry, 5$^{th}$ Ed., Vol. 21, page 169, 1992) in the range from about −50° C. to about +50° C. In an embodiment the polymer has a particle size in the range from about 10 nm to about 2000 nm.

Suitable polymer dispersions are commercially available. For example, the Acronal® dispersions (acrylic and styrene acrylic dispersions) or Styrofan© dispersions (styrene butadiene dispersions) of BASF SE can be used as well as ethylene-vinylacetate dispersions (Vinnapas® from Wacker AG or Elotex® from Akzo Nobel).

In step (b), a first water-soluble salt of a multivalent metal is added to the polymer dispersion ("water soluble" shall mean here and below that at least 1 part of the salt is soluble in 100 parts of water at 20° C.). The multivalent metal is preferably selected from calcium, barium, aluminum, magnesium, zirconium, iron or zinc or a mixture of two or more salts thereof, in particular calcium or aluminum or a mixture thereof. Calcium is preferred. Examples for such salts are calcium chloride, calcium nitrate, calcium formate, calcium acetate, calcium hydroxide, aluminum chloride, aluminum nitrate, aluminum hydroxide, magnesium chloride, magnesium sulfate, magnesium nitrate, ferrous chloride, ferrous sulfate, ferric chloride, ferric nitrate, zirconyl nitrate or zinc chloride. The cations at least partially neutralize the negative charges that are obtained by deprotonation of the anionic or anionogenic groups.

The polymer and the cation are used in amounts such that the molar ratio of surface charge of polymer:cation is 1:2-20, preferably 1:2-8

In step (c) a second water-soluble salt is added to the polymer dispersion. The anion is selected from aluminate, silicate, borate, sulfate, or carbonate or a mixture of two or more thereof. Preferably, the anion is silicate or aluminate, in particular aluminate. Suitable water soluble compounds comprising said anion are, for example, alkali metal salts, like sodium or potassium salts, or ammonium salts. The addition of the anions at least partially compensates the remaining positive charges of the cations, and vice versa.

The first salt is essentially free of an anion as defined in step c) and the second salt is essentially free of cations as defined in step b). The term "essentially" as used herein means that the first salt does not comprise more than 5% by weight, preferably not more than 1% or 0.1% by weight and in particular 0% by weight, of an anion as defined in step c) and that the second salt does not comprise more than 5% by weight, preferably not more than 1% or 0.1% by weight and in particular 0% by weight, of a cation as defined in step b), based on the weight of the first or second salt, respectively.

The sequence of said steps is in the order a), b), c) in the case of negatively charged polymer particles, and a), c), b) in the case of positively charged polymer particles.

The polymer, cation and anion are used in amounts such that the molar ratio of surface charge of polymer:cation:anion is 1:2-20:2-20, preferably 1:2-8:2-8. The weight of the shell should be between 10 and 50%, preferably between 10 and 20%, based on the weight of the polymer core.

After the addition of the cation and the anion of steps (b) and (c) the pH of the dispersion should be in the range from 9 to 13, preferably 9.5 to 12. If the pH is below or above said range, it has to be readjusted using an acid like nitric acid, formic acid, phosphoric acid or hydrochloric acid or a base like ammonium hydroxide, sodium hydroxide or potassium hydroxide.

A second aspect of the present invention is an aqueous polymer dispersion obtainable by any process as disclosed hereinabove.

The obtained dispersion can be subjected to a drying step e) in order to obtain a redispersible polymer powder. This is a third aspect of the present invention. Drying can be carried out in a conventional manner, for example by spray drying, fluidized bed drying, drum drying, flash drying or freeze drying. Surprisingly, the obtained polymer powder after drying is redispersible and shows no discoloration.

A spray drying aid, a further surfactant and/or a plasticizer may be added immediately prior to step e). As a "spray drying aid", any such substance known in the art can be used. The term "further surfactant" as used here is to include all surfactants as described hereinabove. Such further surfactant also comprises a hydrophobic tail and an ionic or ionizable head. The term "plasticizer" is intended to refer to any plasticizer or dispersant for an aqueous inorganic binder composition, especially a cement slurry, particularly Portland cement. So-called comb polymers are particularly preferred plasticizers. In this way the capability for drying and the redispersibility of the polymer powder is even further improved. The amount of spray drying aid, surfactant and/or plasticizer is, in general, 0.1 wt.-% to 10 wt.-%, based on the weight of the polymer.

The redispersible polymer powder of the invention has an average particle size after drying in the range from about 10 µm to about 100 µm. Upon redispersion the average particle size is ≤2 µm, preferably ≤1.1 µm and in particular in the range from about 100 µm to about 1500 µm.

A further aspect of the present invention is a redispersible polymer powder obtainable by a process as disclosed hereinabove.

The process of the invention results in a redispersible polymer powder formed of particles which comprise an organic (latex) core and a dense amorphous or crystalline shell (layer) of an inorganic salt formed from the cation used in step (b) and the anion used in step (c). The preferred inorganic salt is calcium aluminate. The thickness of the shell is, in general, in the range from about 2 nm to about 170 nm according to transmission electron microscopy (TEM) data. Shell thickness can be controlled by the amount of water soluble cation salt and anion compound. The shell is attached to the latex core by strong electrostatic interactions which prevent the organic polymer in the core from moving and diffusing into another particle even in case the organic polymer has a glass transition temperature below 0° C. Thus, the inorganic shell prevents agglomeration (caking) of the polymer particles during drying and storage with no or less drying additives being required. Thus, the redispersible polymer powder has a high storage stability, does not lead to any coloration and improves the wet strength of the final product. In addition, as long as the shell is intact and fully surrounding the polymer core, the polymer core cannot unfold its properties and is protected from outside influences. Only after the shell is at least partially removed, in particular by dissolution or shear stress, the core can develop its properties and is accessible to influences of the surrounding medium (concept of triggered release). For example, when the polymer powder is finally applied, for instance in a cementitious composition, the inorganic shell is at least partially removed by dissolving at alkaline pH and/or by shear stress during mixing and the latex particle is set free again. The inorganic shell (salt) is embedded in the cementitious matrix and the latex particles can develop their properties and are, for example, able to form a film whereas the salt has no negative effect on the final performance profile.

"Redispersible" as used herein means that the particle size, as determined by dynamic light scattering, of the polymer particles after drying and redispersing in water or alkaline media (pH>12-13) such as artificial pore solution is ≤5 µm, preferably ≤3 µm, and in particular ≤1 µm. Furthermore, the redispersed latex dispersion is again capable of film formation after drying. Redispersion in water leads to modified particles with shell, redispersion in strong alkaline media (pH>12-13) such as pore solution leads to original latex particles (without shell).

Further, the invention relates to a composition comprising the redispersible polymer powder of the invention. According to an embodiment, the composition is a building material composition which comprises a hydraulic binder such as cement, in particular OPC (ordinary Portland cement), high alumina cement, a latent hydraulic binder such as metakaolin, calcium metasilicate, volcanic slag, volcanic tuff, trass, fly ash, blast furnace slag etc. or a non-hydraulic binder such as gypsum, including α- and β-hemihydrate or anhydrite. According to an embodiment, the composition is a dry mortar composition which can be formulated as repair mortar, tile adhesive, tile grout, self-leveling floor screed, self-leveling smoothing, underlayment, overlayment, sealing slurry, sealing mud, joint filler or cementitious industrial floor composition.

The compositions of the invention may contain additives such as pigments, flame-proofing materials, crosslinkers, fillers, like sand, lime or silica, reinforcing agents such as fibers, antioxidants, fungicides, accelerators such as alkali metal carbonates, retardants such as tartaric acid or citric acid, thickeners, foam inhibitors, preservatives, wetting agents, rheology modifying agents, vulcanizing agents, adhesion aids, etc.

The following examples illustrate the invention without limiting it. Dispersions used for modification are given in table 1:

TABLE 1

| Dispersion | Characterization | Solid content [w %] | Tg [° C.] | Charge density [µmol/g] | DLS-data Z-average (d · nm) and [PDI] |
|---|---|---|---|---|---|
| D1 | Acrylic dispersion (50% BA, 49% S, 1% AS) | 55 | +19 | −60 | 321 [0.04] |
| D2 | Styrene butadiene dispersion (66% S, 34% B) | 50 | +18 | −130 | 189 [0.02] |
| D3 | Acrylic dispersion (61% BA, 36% S, 3% AS) | 53 | +1.5 | −240 | 250 [0.05] |
| D4 | Acrylic dispersion (57% EHA, 33% S, 6% BA, 4% AS) | 55 | −14 | −260 | 296 [0.20] |

DLS = dynamic light scattering
PDI = polydispersity index
S = Styrene,
BA = Butyl acrylate,
B = butadiene,
AS = Acrylic acid,
EHA = Ethyl hexyl acrylate.

Methods:
Dynamic Light Scattering

The particle size distribution is determined using a Malvern Zetasizer Nano ZS (Malvern Instruments GmbH, Germany). The software utilized for measurement and evaluation is the Malvern software package belonging to the instrument. The measurement principle is based on dynamic light scattering, more particularly on non-invasive backscattering. Unless otherwise stated, the particle sizes given throughout the present specification are so-called $d_{(63)}$-values, meaning that 63% of the measured particles are below the given value.

Spray Drying

The dispersions of the invention can be converted into powder form by spray drying. The dispersions are dried using a spray drier with two-fluid nozzle (e.g. Mobil Minor model from GEA Niro) at an entry temperature of about 230° C. and an exit temperature of about 80° C.

Freeze Drying

Freeze drying was carried out in a conventional manner using Christ Alpha 2-4 LSC freeze drying apparatus.

Viscosity Measurement

Viscosity was determined after 5, 30 and 60 min using a Brookfield viscosimeter DV II+Pro, spindle S95, 2.5 rpm.

EXAMPLE 1: MODIFICATION OF D1

The ratio of surface charge:cation:anion was set to 1:8:4. The modification of the latex particles was performed in aqueous solution (dispersion) under pH control in a glass beaker. 359.52 g D1 dispersion (200 g pure polymer, 14 mmol $e^-$ surface charge) were stirred (500 rpm) in a beaker and 14.57 g calcium formate (112 mmol $Ca^{2+}$, dissolved in 171 g $H_2O$) were slowly added over the course of 2.5 h (dosing rate 70 mL/h). After 30 min, the addition of 4.59 g $NaAlO_2$ (56 mmol $AlO_2^-$), dissolved in 50 g $H_2O$ was started (dosing rate 25 mL/h). During modification a thixotropic effect was observed and a white dispersion with pH=11.6 and 35% solid content was obtained.

EXAMPLE 2: DRYING OF MODIFIED D1 OF EXAMPLE 1

The calcium aluminate-modified dispersion of example 1 was freeze-dried. Another lot was spray dried. In both cases, a colorless, free-flowing powder was obtained.

The freeze-dried powder was characterized by transmission electron microscopy (TEM, FIG. 1). FIG. 1 shows polymer particles wherein the polymeric core is coated with a salt shell.

EXAMPLE 3 (REFERENCE): DRYING OF UNMODIFIED D1

Freeze drying and spray drying of the non-modified D1 dispersion was not possible due to agglomeration. In case of freeze-drying a flexible polymer mass was obtained, spray drying was impossible due to plugging of the nozzle.

The freeze-dried material could not be redispersed in water or alkaline media such as artificial pore solution (table 2).

EXAMPLE 4: REDISPERSION

The freeze- and spray-dried powders of example 2 as well as the polymeric mass of example 3 were redispersed in artificial pore solution (table 2).

Artificial pore solution comprises: $Ca^{2+}$: 10 mmol/L, $Na^+$: 98.5 mmol/L, $K^+$: 181.6 mmol/L, $SO_4^{2-}$: 86.2 mmol/L with a pH of 13.1.

For redispersion, 1.0 g of the powder was stirred in 10 mL of this artificial pore solution for 30 min with a magnetic stir bar or the mixture was treated in an ultrasonic bath for 30 min. The particle size was determined as mentioned above 12 h after the treatment. Particle sizes below 1 μm indicate sufficient redispersion.

TABLE 2

| | Entry | | | |
|---|---|---|---|---|
| | 2.1 (Reference) | 2.2 (Reference) | 2.3 (Invention) | 2.4 (Invention) |
| Dispersion | D1 (liquid) | D1 (unmodified, freeze-dried) (Ex. 3) | D1 modified, freeze dried (Ex. 2) | D1 modified, spray dried (Ex. 2) |
| Z-average (d · nm) | 321 | Not redispersible | 488 | 531 |
| PDI | 0.04 | Not redispersible | 0.28 | 0.57 |

Both powders (freeze and spray dried) can be redispersed in artificial pore solution. The unmodified dried dispersion D1 (entry 2.2) cannot be redispersed.

Redispersion was also evaluated by the ability of film formation. The powders redispersed in artificial pore solution were allowed to dry at room temperature for 24 h. For powders of entries 2.3 and 2.4 stable, flexible films were obtained. In case of entry 2.2 no film was obtained but the polymeric mass was recovered.

EXAMPLE 5A: APPLICATION IN MORTAR

The spray dried polymer powder of example 2 was subjected to application tests in a mortar composition comprising 675 g of cement (Milke 52.5 N, Heidelberg Cement AG, Heidelberg, Germany) and 1350 g of Normensand® (Normensand GmbH, Beckum, Germany). A w/c (water/cement) ratio of 0.4 and 15% of the redispersible powder (polymer content by weight of cement) were used, temperature was set to 20° C. The mortar was produced in accordance with DIN EN 196-1:2005. Immediately after the end of the mixing operation the slump flow was determined using a Haegermann cone in accordance with the SVB guidelines of the Deutscher Ausschuss für Stahlbeton (German reinforced concrete committee). The setting time was determined by using a standard Vicat apparatus according to DIN EN 196-3. Results are given in table 3.

TABLE 3

| | Entry | | | |
|---|---|---|---|---|
| | 3.1 (Reference) | 3.2 (Invention) | 3.3 (Reference) | 3.4 (Reference) |
| Dispersion | none | D1 modified, spray dried (Ex. 2) | D1 (liquid dispersion) | Acronal S 735 P |
| Slump flow (5 min) [min] | 14.5 | 11 | 17.8 | 36.5 |
| Initial setting time [min] | 264 | 248 | 380 | 792 |
| Final setting time [min] | 305 | 442 | 516 | 1058 |

The slump flow of a commercial powder (Acronal S 735 P, BASF SE, Ludwigshafen) is significantly higher due to the presence of standard spray drying aids. In case of the new redispersible polymer powder (RDP) comprising the modified polymer particles (D1 modified, spray dried, entry 3.2) the slump flow is significantly reduced, indicating less fluidification of the new RDP and better workability also in comparison to the pure liquid D1 dispersion (D1 liquid, entry 3.3). In the presence of the new RDP comprising the modified polymer particles also the setting time is reduced significantly, indicating less retardation.

EXAMPLE 5B: APPLICATION TEST IN TILE ADHESIVE

The polymer powders of example 2 were subjected to application tests in tile adhesives. The composition is given in table 4.

TABLE 4

| Compound | Amount [g] |
|---|---|
| Quarzsand HS 5 | 481 |
| Milke CEM 52,5 | 400 |
| Calciumformate | 7.5 |

TABLE 4-continued

| Compound | Amount [g] |
|---|---|
| Juraperle Ulmerweiss MHMS | 60 |
| Cellulose fiber FD 40 | 6.6 |
| Cellulose ether MC30US | 3.5 |
| Starvis SE 45 F | 1.2 |
| Starvis T 50 F | 0.2 |
| Total: | 960 |
| Dispersion (g polymer) | 40 |
| Water | 300 |

Milke Cem I 52.5 is a Portland cement available commercially from Heidelberg Cement AG. Juraperle Ulmerweiss MHMS is limestone (calcium carbonate) from Eduard Merkle GmbH & Co. KG., Blaubeuren-Altental, Germany. Cellulose ether MC30US is a cellulose ether (Samsung Fine Chemicals), Cellulose fiber FD 40 is a medium sized off-white technical cellulose fiber (Arbocel®, J. Rettenmaier & Söhne GmbH+Co KG, Rosenberg, Germany), Starvis SE 45 F is a rheology modifying air-void stabilizing agent from BASF SE, Ludwigshafen, Germany and Starvis T 50 F is a thickener for improved mixing properties (BASF SE, Germany).

The amount of dispersion was always calculated to 4% polymer content in total. If liquid dispersions were used, 40 g of pure polymer were added and the amount of additionally added water was reduced by the amount present in the liquid dispersion. The flexibility was determined according to 3-point flexural strength (DIN EN 12002) using a Zwick Roell 1120 test machine. The results are given in table 5 below.

TABLE 5

| | Entry | | | |
|---|---|---|---|---|
| | 5.1 (Reference) | 5.2 (Reference) | 5.3 (Invention) | 5.4 (Invention) |
| Dispersion | none | D1 (liquid reference) | D1 modified, liquid Dispersion | D1 modified, spray dried (Ex. 2) |
| 3-point flexural tensile strength [mm] | 1.6 | 2.9 | 2.9 | 2.8 |
| 3-point flexural tensile strength [N] | 11.4 | 8.9 | 9.5 | 7.2 |

The new RDP comprising the modified polymer particles (D1 modified, spray dried, entry 5.4) exhibits a comparable flexibilizing effect as the unmodified liquid reference (D1, entry 5.2) and the calciumaluminate-modified liquid dispersion (D1 modified, liquid Dispersion, entry 5.3).

EXAMPLE 6: MODIFICATION OF D2

The modification of dispersion D2 was performed as described in example 1 using the cation and anion sources as given in table 6. The charge:cation:anion ratio was set to 1:8:4. The final pH of the modified dispersions was adjusted to pH=9 with $HNO_3$ (8 N) or aqueous formic acid (50%).

TABLE 6

| Entry | Dispersion | Cation source | Anion source | $H_2O$ [g] | Properties |
|---|---|---|---|---|---|
| 6A | D2 (30.81 g, 2 mmol e⁻) | $Ca(NO_3)_2$ (51%, 5.15 g, 16 mmol $Ca^{2+}$) | $NaAlO_2$ (0.66 g, 8 mmol $AlO_2^-$) | 63.39 | Stable white viscous dispersion; colorless powder after freeze and spray drying. |
| 6B | D2 (15.41 g, 1 mmol e⁻) | $Ca(HCOO)_2$ (1.04 g, 8 mmol $Ca^{2+}$) | $NaAlO_2$ (0.33 g, 4 mmol $AlO_2^-$) | 33.23 | Stable white viscous dispersion; colorless powder after freeze and spray drying. |

The obtained white liquid dispersions were freeze and spray dried as described in Ex. 2 to give white powders. The redispersibility in artificial pore solution as described in Ex. 4 was examined and the particle size of the redispersed particles (entries 7.2 to 7.4, table 7) was compared to the original particle size (table 7 entry 7.1).

TABLE 7

| | Entry | | | |
|---|---|---|---|---|
| | 7.1 | 7.2 | 7.3 | 7.4 |
| DLS data | D2 (Reference) | D2 modified, freeze dried (Ex. 6A) | D2 modified, freeze dried (Ex. 6B) | D2 modified, spray dried (Ex. 6B) |
| Z-average (d · nm) | 189 | 310 | 320 | 365 |
| PDI | 0.02 | 0.41 | 0.54 | 0.57 |

The powders redispersed in artificial pore solution were also allowed to dry at ambient temperature for 24 h. All powders (freeze and spray dried Ex. 6A and 6B) exhibit film formation upon drying and stable, flexible films are obtained.

EXAMPLE 7: APPLICATION TEST IN TILE ADHESIVE

The polymer powders of example 6 were subjected to application tests in tile adhesives. The composition is given in table 4. All tests were performed as described hereinabove. Skin formation time was determined with a glazed norm tile (10×10 cm, 80 g) which was put with its edge on a ridged tile adhesive surface. If no residual material sticks to the edge, skin formation is achieved. Results are given in table 8.

TABLE 8

| | Entry | | | |
|---|---|---|---|---|
| | 8.1 | 8.2 | 8.3 | 8.4 |
| Tile Adhesive application test | Reference without RDP | D2 (liquid reference) | D2 modified liquid dispersion (Ex. 6B, not dried) | D2 modified liquid dispersion, freeze dried (Ex. 6B, freeze-dried) |
| Viscosity [mPas] | 2.670.000 | 1.460.000 | 1.753.000 | 2.176.000 |
| 3-point flexural tensile strength [mm] | 1.6 | 2.6 | 2.4 | 1.9 |
| 3-point flexural tensile strength [N] | 11.4 | 8.5 | 11.9 | 7.6 |
| Skin formation time [min] | 16 | 23 | 11 | 13 |

The salt-modified dispersions exhibit improved (higher) viscosity, reduced skin-forming time and thus no retardation of the system and a comparable flexibilizing effect as the liquid reference (D2).

EXAMPLE 8: MODIFICATION OF D3

The ratio of surface charge:cation:anion was set to 1:8:4. The modification of the latex particles was performed in aqueous solution (dispersion) under pH control in a glass beaker. 1064.44 g D3 dispersion (565.22 g pure polymer, 130 mmol e⁻ surface charge) were stirred (500 rpm) in a beaker and 135.31 g calcium formate (1040 mmol $Ca^{2+}$, dissolved in 1400 g $H_2O$) were slowly added over the course of 2.5 h. After 30 min, the addition of 42.62 g $NaAlO_2$ (520 mmol $AlO_2^-$), dissolved in 270 g $H_2O$ was started. During modification a thixotropic effect was observed and a white dispersion with pH=10.9 and 25% solid content was obtained.

EXAMPLE 9: DRYING AND REDISPERSION OF MODIFIED D3 OF EXAMPLE 8

The calcium aluminate-modified dispersion of example 8 was freeze-dried and spray dried as described in example 2. In both cases, a colorless, free-flowing powder was obtained. Redispersion was evaluated according to example 4. Results are given in table 9.

TABLE 9

| | Entry | | |
|---|---|---|---|
| | 9.1 | 9.2 | 9.3 |
| DLS data | D3 (Reference) | D3 modified and freeze dried (Ex. 10) | D3 modified and spray dried (Ex. 10) |
| Z-average (d · nm) | 250 | 612 | 892 |
| PDI | 0.05 | 0.46 | 0.81 |

Redispersion was also evaluated by the ability of film formation. The powders redispersed in artificial pore solution or an alkaline NaOH-solution with pH=13 were allowed to dry at room temperature for 24 h. For both powders in both cases stable, flexible films were obtained.

Freeze drying and spray drying of the non-modified D3 dispersion was not possible due to agglomeration. In case of freeze-drying a very flexible polymer film was obtained, spray drying was impossible due to plugging of the nozzle. Both polymeric materials cannot be redispersed, neither in artificial pore solution nor in alkaline media.

EXAMPLE 10: MODIFICATION OF D4

The ratio of surface charge:cation:anion was set to 1:8:4. The modification of the latex particles was performed in aqueous solution (dispersion) under pH control in a glass beaker. 174.9 g dispersion D4 (96.15 g pure polymer, 25 mmol e⁻ surface charge) were stirred (500 rpm) in a beaker and 26.02 g calcium formate (200 mmol $Ca^{2+}$, dissolved in 300 g $H_2O$) were slowly added over the course of 2.5 h. After 30 min, the addition of 8.20 g $NaAlO_2$ (100 mmol $AlO_2^-$), dissolved in 100 g $H_2O$ was started. During modification a thixotropic effect was observed and a white dispersion with pH=11.3 and 21% solid content was obtained.

EXAMPLE 11: DRYING AND REDISPERSION OF MODIFIED D4 OF EXAMPLE 10

The calcium aluminate-modified dispersion of example 10 was freeze-dried and spray dried as described in example 2. In both cases, a colorless, free-flowing powder was obtained. Redispersion was evaluated according to example 4. Results are given in table 10.

TABLE 10

| | Entry | | |
|---|---|---|---|
| | 10.1 | 10.2 | 10.3 |
| DLS data | D4 (Reference) | D4 modified, freeze dried (Ex. 10) | D4 modified, spray dried (Ex. 10) |
| Z-average (d · nm) | 296 | 361 | 810 |
| PDI | 0.2 | 0.36 | 0.68 |

Redispersion was also evaluated by the ability of film formation. The powders redispersed in artificial pore solution or alkaline media (see example 9) were allowed to dry at room temperature for 24 h. For both powders white, stable, flexible films were obtained.

Freeze drying and spray drying of the non-modified D4 dispersion was not possible due to agglomeration. In case of freeze-drying a flexible polymer film was obtained, spray drying was impossible due to plugging of the nozzle, both products cannot be redispersed in artificial pore solution or alkaline media.

The invention claimed is:

1. A process for modifying polymer particles of an aqueous polymer dispersion, the process comprising:
    a) providing an aqueous polymer dispersion comprising positively or negatively charged polymer particles, wherein a surface charge of the polymer particles is in the range of from −300 to −30 μmol/g polymer or from 30 to 300 μmol/g polymer;
    b) adding at least one first water-soluble salt of multivalent metal selected from the group consisting of magnesium, calcium, barium, aluminum, zirconium, iron and zinc, wherein the first salt essentially does not contain an anion as defined in c);
    c) adding at least one second water-soluble salt comprising an anion selected from the group consisting of aluminate, silicate, borate, sulfate, and carbonate, wherein the second salt essentially does not comprise a cation as defined in b);
    wherein the sequence of a), b) and c) is in the order a), b), c) in the case of negatively charged polymer particles, or a), c), b) in the case of positively charged polymer particles.

2. The process of claim 1, wherein the polymer particles in a) have a particle size of ≤2.0 μm, as determined by dynamic light scattering.

3. The process of claim 1, wherein the process further comprises d) adjusting the pH-value of the obtained aqueous dispersion to a value within a range of 9 to 13.

4. The process of claim 1, wherein the cation of b) is calcium and the anion of c) is aluminate or silicate.

5. The process of claim 3, wherein the pH-value of the obtained aqueous dispersion is adjusted to a value within a range of 9.5 to 12 in d).

6. The process of claim 1, wherein the aqueous polymer dispersion of a) further comprises a surfactant having a hydrophobic tail and an ionic or ionizable head.

7. The process of claim 1, wherein the polymer of the polymer particles is
- α) a copolymer of a non-ionic monomer (i) which is selected from the group consisting of esters of $C_3$-$C_6$ α,β-monoethylenically unsaturated monocarboxylic acid and α,β-monoethylenically unsaturated $C_4$-$C_8$ dicarboxylic acids, a further non-ionic monomer (ii) which is a vinylaromatic monomer, and vinyl or allyl esters of $C_1$-$C_{18}$ monocarboxylic acids and anionic or anionogenic monomers (iii) having an anionic or anionogenic functionality in their molecules, or
- β) a copolymer of at least one nonionic monomer of a vinylaromatic monomer with (meth)acrylonitrile and butadiene, or
- γ) a copolymer of at least one olefin with at least one vinyl ester of a $C_1$-$C_{18}$ monocarboxylic acid, or
- δ) a polyurethane comprising carboxylic acid and/or carboxylate groups and/or sulfo groups.

8. A process for preparing a redispersible polymer powder comprising
- d) drying the aqueous polymer dispersion obtained by the process of claim 1.

9. The process of claim 1, wherein the aqueous polymer dispersion whose dispersion polymer comprises in copolymerized from:

≥50 and ≤99.9 wt. % esters of acrylic and/or methacrylic acid with alkanols having 1 to 12 C and/or styrene, or
≥40 and ≤99.9 wt. % styrene and/or butadiene, or
≥50 and ≤99.9 wt. % vinyl chloride and/or vinylidene chloride, or
≥40 and ≤99.9 wt. % vinyl acetate, vinyl propionate and/or ethylene.

10. The process of claim 1, wherein the aqueous polymer dispersion whose dispersion polymer comprises in copolymerized from:

≥0.1 and ≤5 wt. % at least one α, β-monoethylenically unsaturated mono- and/or dicarboxylic acid having 3 to 6 carbon atoms and/or amide thereof and
≥50 and ≤99.9 wt. % at least one ester of acrylic and/or methacrylic acid having 1 to 12 C-alkanols and/or styrene, or
≥0.1 and ≤5 wt. % at least one α, β-monoethylenically unsaturated mono- and/or dicarboxylic acid having 3 to 6 carbon atoms and/or amide thereof and
≥40 and ≤99.9 wt. % styrene and/or butadiene, or
≥0.1 and ≤5 wt. % at least one α, β-monoethylenically unsaturated mono- and/or dicarboxylic acid having 3 to 6 carbon atoms and/or amide thereof and
≥50 and ≤99.9 wt. % vinyl chloride and/or vinylidene chloride, or
≥0.1 and ≤5 wt. % at least one α, β-monoethylenically unsaturated mono- and/or dicarboxylic acid having 3 to 6 carbon atoms and/or amide thereof and
≥40 and ≤99.9 wt. % vinyl acetate, vinyl propionate and/or ethylene in copolymerized form.

11. The process of claim 1, wherein the aqueous polymer dispersion whose dispersion polymer comprises in copolymerized from:

≥45 and ≤55 wt. % n-butyl acrylate and/or 2-ethylhexyl acrylate,

≥45 and ≤55 wt. % styrene and/or methyl methacrylate,

≥0.1 and ≤5 wt. % acrylic acid and/or methacrylic acid and

≥0.1 and ≤5 wt. % acrylamide and/or methacrylamide.

12. The process of claim 1, wherein the aqueous polymer dispersion whose dispersion polymer has a Tg in the range from −50° C. to 50° C.

13. The process of claim 1, wherein the polymer of the polymer particles has a particle size in the range from about 10 nm to about 2000 nm measured by dynamic light scattering.

* * * * *